May 1, 1962 — P. C. SKRMETTA ETAL — 3,031,714
SHRIMP DE-VEINER
Filed Aug. 12, 1958 — 6 Sheets-Sheet 1

Paul C. Skrmetta
Raphael Q. Skrmetta
INVENTORS

Paul C. Skrmetta
Raphael Q. Skrmetta
INVENTORS

May 1, 1962  P. C. SKRMETTA ETAL  3,031,714
SHRIMP DE-VEINER

Filed Aug. 12, 1958  6 Sheets-Sheet 5

Paul C. Skrmetta
Raphael Q. Skrmetta
INVENTORS

United States Patent Office 3,031,714
Patented May 1, 1962

3,031,714
SHRIMP DE-VEINER
Paul C. Skrmetta and Raphael Q. Skrmetta, both of
3536 Lowerline St., New Orleans, La.
Filed Aug. 12, 1958, Ser. No. 754,591
17 Claims. (Cl. 17—2)

This invention comprises a novel and useful shrimp de-veiner and more particularly relates to a method and means for effectively removing the sand vein from shrimp in an improved manner and with a great efficiency of operation.

The primary object of this invention is to provide an apparatus and a method which will facilitate the de-veining of shrimp by throwing them back and forth from side to side across a line of travel along which they progress, and against a series of knives so placed as to cut the back of the shrimp and expose the sand vein thereof.

A further object of the invention is to provide an apparatus and a method in accordance with the preceding object which shall utilize the influence of gravity either alone or in conjunction with other propelling means to cause the shrimp to progress along a path of travel.

A further object of the invention is to provide an apparatus and method in accordance with the preceding objects which shall effectively slice the back of the shrimp and expose the sand vein thereof, regardless of the size of the shrimp; and which shall to a considerable extent enable the sand vein to be cleaned from the shrimp during the travel of the latter through the de-veining apparatus.

A further object of the invention is to provide an apparatus and a method for de-veining shrimp in accordance with the preceding objects wherein the shrimp shall be caused to move laterally or from side to side across a flat surface along which the shrimp progress longitudinally.

Yet another object of the invention is to provide an apparatus and a method whereby a transverse rocking motion about a longitudinal axis may be imparted to the surface along which the shrimp progress in order to effect the side to side travel of the shrimp against a plurality of knives.

A still further object of the invention is to provide an apparatus in accordance with the preceding objects wherein the side to side motion of the shrimp shall be effected by a transverse rectilinear reciprocation of a flat surface along which the shrimp are caused to move longitudinally.

A still further object of the invention is to provide a means and a method whereby the transverse side to side motion of the shrimp shall be effected by causing the same to pass through the concave surface of a trough while causing the latter to rock about an axis longitudinally thereof.

A further object of the invention is to provide an apparatus and method whereby the de-veining of the shrimp shall be effected during the passing of the latter through a rotating barrel having spiral knives therein.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The basic principle of the method and of the apparatuses disclosed herein resides in causing shrimp to progress longitudinally along a supporting surface while causing the shrimp to shift transversely or to be thrown back and forth across the surface to strike longitudinally extending knives and thus slice the back of the shrimp to expose the sand vein thereof during the longitudinal travel of the shrimp along the surface. It has been found, that regardless of the size of the shrimp, when the shrimp slide upon their sides along a surface, that portion of the back of the shrimp beneath which lies the sand vein will be disposed and substantially at the same vertical distance from the surface. Use is made of this characteristic of shrimp to position series of knives extending longitudinally of the surface and at a sufficient distance above the same to cut the back of the shrimp and expose the sand vein.

It is further known that when shrimp are forcefully slid across a surface, especially across one along which they are progressing longitudinally, they will turn over on their side to present their back in a forward position of their transverse sliding motion. Consequently, when shrimp are hurled transversely across a sliding surface, they will almost invariably strike any abutting surface or element along the side of the sliding surface with their backs. Use is made of this characteristic of shrimp to position a series of longitudinally spaced knives at the sides of the surface along which the shrimp are sliding longitudinally, so that when the shrimp are caused to be hurled transversely across the surface, their backs will strike the knives and due to the components of longitudinal and transverse sliding movement, will cause the knives to slice or cut the back of the shrimp and thus expose the sand vein thereof.

The foregoing particular characteristics and properties of shrimp and the above set forth basic principles for utilizing the same in accordance with this invention form essential features of the apparatuses and of the method in accordance with the present invention.

*Embodiment of FIGURES 1–8*

Figures 1, 5, 6, 7, 8:
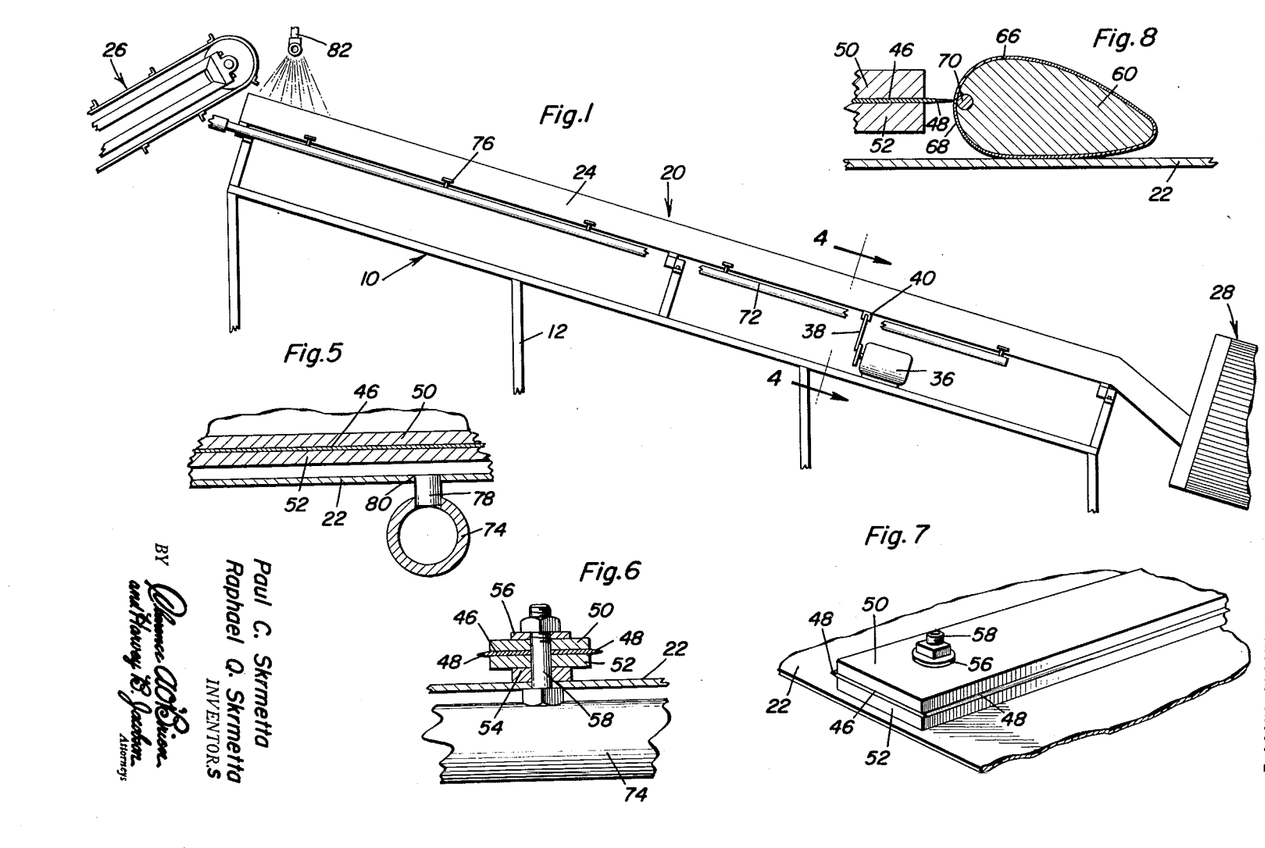
FIGURE 1 is a view in vertical elevation showing the preferred embodiment of an apparatus to effect the de-veining of shrimp by a continuous operation, parts of the apparatus being broken away.
FIGURES 5 and 6 are detail views taken upon an enlarged scale substantially upon the plane indicated by the section lines 5—5 and 6—6 respectively of FIGURE 2 and showing certain details of the knife constructions employed with this apparatus.
FIGURE 7 is a fragmentary perspective view showing the manner in which the longitudinal extending knives are mounted upon the floor of the device along which the shrimp are adapted to pass.
FIGURE 8 is a fragmentary view similar to FIGURE 7 but in vertical transverse section and showing the manner in which the knives are positioned and coact to slice the back of the shrimp and expose the sand vein thereof.
Figure 2:
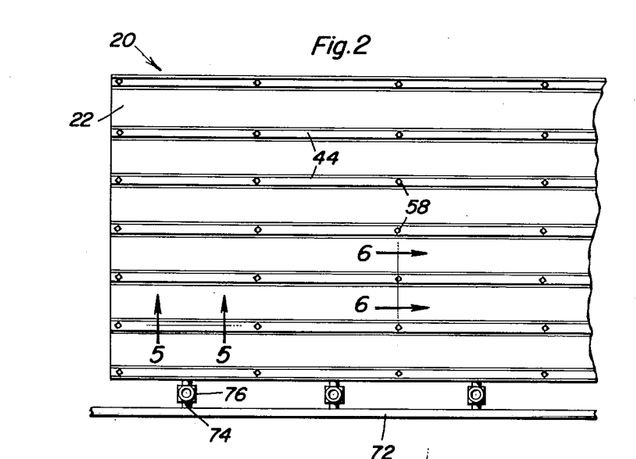
FIGURE 2 is a fragmentary view in top plan of a portion of the surface of the apparatus along which the shrimp are adapted to longitudinally pass and upon which the shrimp are given a side to side back and forth motion.
Figure 3:
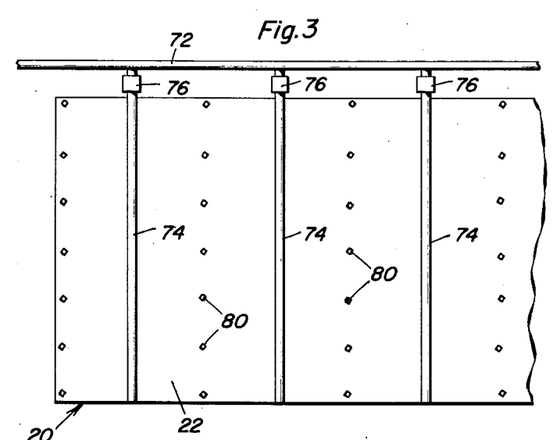
FIGURE 3 is a bottom plan view of the arrangement of FIGURE 2 and showing the means for applying a water spray to the surface along which the shrimp are adapted to pass.
Figure 4:
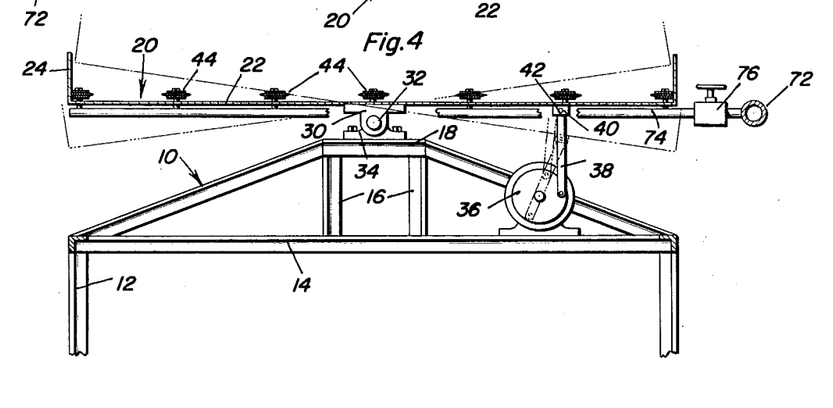
FIGURE 4 is a vertical transverse sectional view taken upon an enlarged scale substantially upon the plane indicated by the section line 4—4 of FIGURE 1 and showing in dotted lines alternative position of the apparatus during rocking of the latter along a central longitudinal axis.

In the embodiment disclosed in FIGURES 1–8, with particular reference to FIGURES 1 and 4, it will be seen that the apparatus includes a supporting frame 10 including supporting legs 12 together with transversely extending frame elements 14 which in turn support as by standards 16 an elongated or a series of longitudinally spaced platforms 18.

As shown in FIGURE 1, the upper surface of the supporting frame and in particular the platform or platforms 18 thereof are inclined longitudinally of the frame to thus utilize the effect of gravity for the passage of shrimp longitudinally of the apparatus as set forth hereinafter. It will be understood however that this inclination of the frame is not absolutely essential for the purpose of this invention, since other means can readily be employed to effect passage of the shrimp longitudinally of the apparatus, either as a substitute for or to assist the effect of gravity for such passage of the shrimp.

Designated generally by the numeral 20 is a passageway for the shrimp, the same being supported upon the supporting frame 10. In the embodiment of FIGURES 1–8, this passageway 20 is in the form of an open chute or trough having a flat bottom wall 22 together with upstanding marginal side walls 24 extending longitudinally of the trough.

Any suitable feeding means such as an elevating conveyor 26 is provided for delivering shrimp to the open inlet or upper end of the passageway 20, while the lower or discharge end of the latter is operatively associated with a receptacle 28 of any desired type, such as one for cleansing the shrimp or further treating the same.

Adjacent its midportion and upon the underside of the same the bottom wall 22 of the passageway is provided with depending fulcrum brackets 30 which are secured as by pivots or fulcrum pins 32 to complementary fulcrum brackets 34 which are secured in longitudinally spaced relation upon the platform or platforms 18. These brackets provide a means whereby the passageway is pivotally supported for oscillatory rocking movement about an axis extending longitudinally of the passageway, between a horizontal inclined position shown in full lines in FIGURE 4 and oppositely tilted rocking position shown in dotted lines in that figure.

Any suitable means may be employed to impart an oscillatory or rocking motion to the passageway 20 about the inclined longitudinally extending axis formed by the pivot pins 32. One satisfactory means, for this purpose, as shown in FIGURES 1 and 4, comprises an electric motor 36 suitably mounted upon the frame members 14 and operatively connected as by connecting rod 38 to a lug 40 as by a pivot pin 42, this lug being suitably attached to the underside of the passageway. Consequently, upon operation of the electric motor, the connecting rod 38 will impart a rocking motion to the passageway along the longitudinal axis of the same, whereby any shrimp traveling longitudinally of the passageway will be thrown from side to side transversely thereof as set forth hereinafter.

Shown at 44 in FIGURES 2 and 4 are a plurality of longitudinally extending knife assemblies disposed in a generally parallel relation and mounted in a particular manner upon the bottom wall 22 of the passageway in a manner and for the purpose set forth hereinafter. These knives are spaced from each other laterally a suitable distance to provide chutes or channels therebetween along which shrimp are adapted to travel longitudinally and be shifted or hurled transversely and laterally thereof from one knife assembly to the other.

The knife assembly 44, see FIGURES 5–8, comprises a flat plate-like blade 46 having its opposite longitudinally extending edges provided with sharpened knife surfaces as at 48. The blade 46 is clamped between upper and lower elongated flat-plate-like clamping blocks 50 and 52 respectively. As shown in FIGURE 6, a spacer collar 54 may be disposed beneath the lower block 52, while a washer or the like 56 may be disposed above the upper block 50. A fastening bolt 58 extends through suitable aligned apertures in these members and through the bottom wall 22 to thereby rigidly clamp the knife assembly in place, with the blade 48 thereof disposed at the desired vertical distance above the bottom wall 42 by means of the properly proportioned spacers 54 and the appropriate thickness of the lower clamping block 52.

If desired, in some instances, the spacers 54 may be omitted and the lower block 52 may be directly clamped upon the bottom wall 22 as shown in FIGURE 7.

As so far described it will now be understood that as the shrimp are discharged from the elevating conveyor 26 to the upper end of the inclined passageway, the same will pass down between the channels formed by pairs of adjacent knife blade assemblies. As the bottom wall 22 of passageway 20 is rocked by the means previously described, the shrimp will be thrown or cast laterally from side to side of the channels or troughs and will be caused to strike first one and then the other of the adjacent knife assemblies 44. As shown in the detail view of FIGURE 8, when the shrimp is hurled sidewise upon the bottom wall 22, it will naturally assume a position in which its back approaches the adjacent knife assembly first. Consequently, since the knife blade is positioned at the proper elevation, the shrimp will strike its back against the knife assembly which in turn will sever or slice the back and expose the sand vein. The latter lies closely adjacent to the back of the shrimp. Shown in FIGURE 8, the shrimp 60 has a shell or hull 62 thereon, and the back 68 of this hull is closely overlying the sand vein 70.

The repeated impacts of the shrimp as the same is thrown from side to side of a channel and the repeated contacts of the sharp knife edges 48 against the back of the shrimp will during the passage of the shrimp longitudinally of the channel effectively sever or slice to open the back and expose the sand vien. The repeated jarrings of the shrimp will very probably in conjunction with the repeated penetration of the knife blades into the region of the sand vein effectively remove the latter. In any event, the shrimp is in the proper condition when it reaches the device 28 to have the sand vein washed therefrom by water, by further jostling or by any other desired manner.

In order to contribute to the passage of the shrimp along the bottom wall 22 of the passageway, the same is kept well lubricated with water. For this purpose, there is securely mounted in any suitable manner upon the passageway 20 a longitudinally extending water supply pipe 72 having, as shown in FIGURES 2 and 3, a plurality of laterally extending branch pipes 74 each of which is provided with a manual control valve 76. These branch pipes 74 underlie the bottom wall 22 of the passageway and are provided with upwardly extending nozzles 78 which extend through apertures 80 in the bottom wall as shown in FIGURE 3. Thus water is delivered in the form of a film which bubbles over and thus lubricates the entire surface of the bottom wall 22. For this purpose apertures 80 are disposed over substantially the entire area of the bottom wall in suitably spaced relation to each other. Under this lubrication, the surface of the bottom wall is maintained in a very slick condition thereby facilitating sliding of the shrimp longitudinally of the inclined passageway and the back and forth lateral travel of the shrimp thereacross in response to the oscillation of the passageway previously mentioned.

Still further, if desired, a water spray 82 may be disposed above the upper or inlet end of the passageway to cause a stream of water to flow downwardly along the same.

In some instances, sufficient water may be discharged by the nozzles 82 and the spray therefrom may be so directed as to in itself constitute a force which will propel the shrimp longitudinally of the passageway even if the latter has its axis horizontal rather than in an inclined position.

Figure 9:
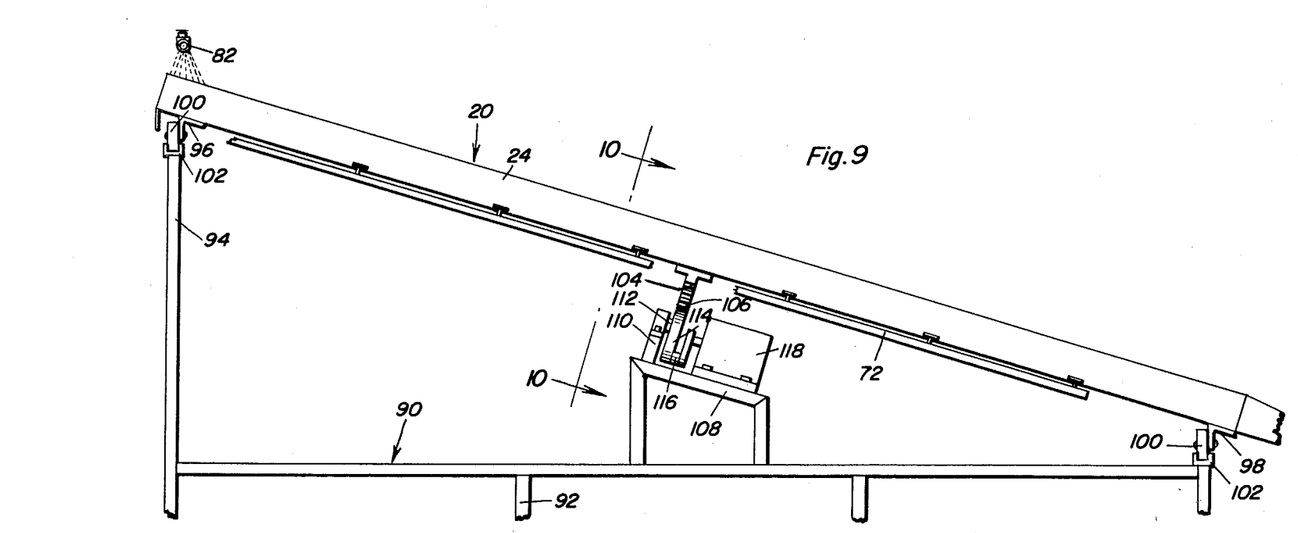
FIGURE 9 is a view in vertical elevation, parts being broken away, and showing a second embodiment of apparatus in accordance with this invention, and in which the surface along which the shrimp is adapted to pass is a flat, longitudinally inclined and transversely rectilinearly reciprocating surface.
Figure 10:
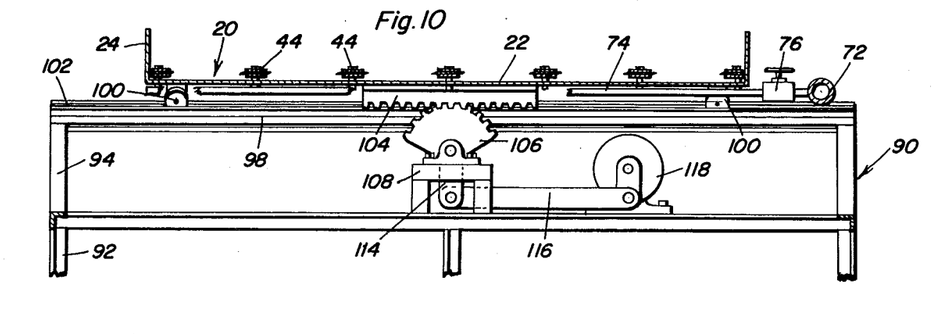
FIGURE 10 is a vertical transverse sectional view taken substantially upon the plane indicated by section line 10—10 of FIGURE 9 and showing further details of the arrangement and of the operating means for rectilinearly reciprocating the surface.

*Embodiment of FIGURES 9 and 10*

FIGURES 9 and 10 show a very similar construction to that of FIGURES 1–8 except that instead of a transverse rocking motion, there is imparted a transverse rectilinear reciprocation to the passageway. In this embodiment there is shown a supporting frame designated generally by the numeral 90, the same including supporting legs 92 with upstanding standards 94 at the opposite ends thereof.

Carried by the standards are transverse or cross members 96 at the upper end and 98 at the lower end. The same carriage construction 20 previously described is employed in this embodiment, and consequently the same numerals have been applied to the elements of the carriage construction, and to the knife assemblies extending longitudinally thereof.

However, the passageway 20 is provided with supporting rollers 100 which ride upon transversely disposed channel members 102 carried by the cross members 96 and 98 and comprising tracks mounting the passageway 20 for transverse reciprocation upon the frame.

Extending transversely of the underside of the passageway and intermediate the ends of the latter there is provided a depending rack 104 which registers with an arcuate sector plate 106.

Secured to a suitable supporting stand 108 is a bearing assembly 110 in which is journaled a fulcrum pin or axle 112 which pivotally mounts the sector plate 106. Depending from the sector plate is a lever arm 114 to which is pivotally connected the connecting rod 116 which in turn is operatively connected to a source of power such as electric motor 118. It will thus be apparent that as the motor is operated, oscillation of the sector plate 106 will cause rectilinear reciprocation of the passageway 20 and thus impart a lateral shifting to the shrimp as the same pass down the channels between the pairs of knife blade assemblies 44. As in the preceding embodiment, the same means is provided for supplying water to the bottom wall by means of the longitudinally extending header 72 together with the transverse branch pipes 74 and manual control valve 76, and the same nozzle assembly (not shown) together with the overhead spray nozzle assembly 82.

Except for the means which impart lateral shifting movement to the passageway 20, and the manner of mounting the latter for rectilinear transverse reciprocation, the operation of this form of the invention is identical to that previously described, and the passageway 20 may be either inclined as shown or may be horizontally disposed with a water spray or other means being imparted for causing longitudinal passage of the shrimp along the same.

Figure 11:
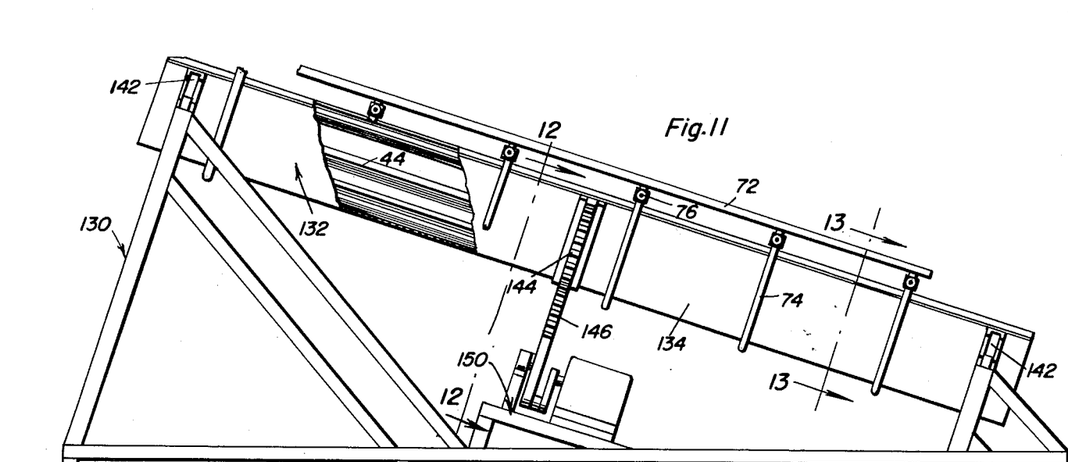
FIGURE 11 is a view in vertical elevation, parts being broken away of a third embodiment of apparatus in accordance with this invention.
Figure 12:
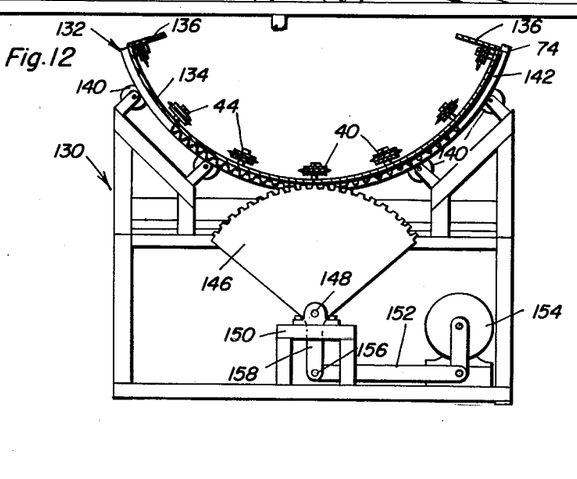
FIGURE 12 is a view in vertical transverse section taken substantially upon a plane indicated by the section line 12—12 of FIGURE 11 and showing the manner in which the trough surface along which the shrimp are adapted to pass is mounted for rocking or oscillatory motion about a longitudinal axis together with a means for oscillating the same.
Figure 13:
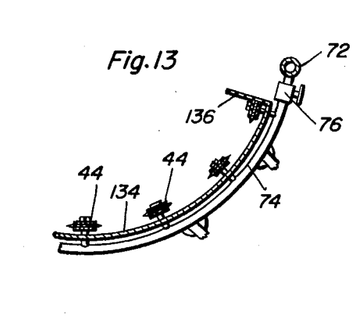
FIGURE 13 is a detail view taken in vertical transverse section substantially upon the plane indicated by the section line 13—13 of FIGURE 11 and showing the manner in which the water spray may be applied to the surface along which the shrimp are adapted to pass.

*Embodiment of FIGURES 11–13*

The embodiment of FIGURES 11–13 is similar to both of the previously described embodiments. It includes a supporting frame assembly designated generally by the numeral 130 upon which is rockably mounted the elongated longitudinally extending passageway 132. In this embodiment the passageway comprises a semi-cylindrical plate 134 comprising a bottom wall having marginal side walls 136. The bottom wall and side walls thus define a trough or chute which is arcuate in cross section. As in the other embodiments, longitudinally extending knife assemblies 44 are secured to this bottom wall and channels or shrimp receiving and shrimp de-veining troughs are provided between adjacent knife assemblies. Any suitable place, as adjacent the ends of the passageway 20, the supporting framework 130 is provided with supporting rollers 140 which engage and are received in track members 142 which may comprise channel members, in order to support the passageway for rocking movement transversely about a longitudinally extending axis. An arcuate rack 144 is secured to the midportion and underside of the passageway, the teeth of which engage with a sector gear 146 which is journaled as at 148 upon a suitable supporting structure 150. A connecting rod 152, driven from an electric motor 154 or other suitable soure of power, is pivotally connected as at 156 to the lower end of a depending lever arm 158 which is rigid with the sector plate 146.

The same water providing means may be employed as in the previous embodiments, including the longitudinally extending header 72, the manual control valve 76 for each of the branch conduits 74, while an overhead spray, not shown, may likewise be provided as desired.

The operation of this form of the invention is identical with those previously described except that the passageway has a rocking movement and is semi-cylindrical or trough shaped.

*Embodiment of FIGURES 14–20*

Figures 14, 17, 20:
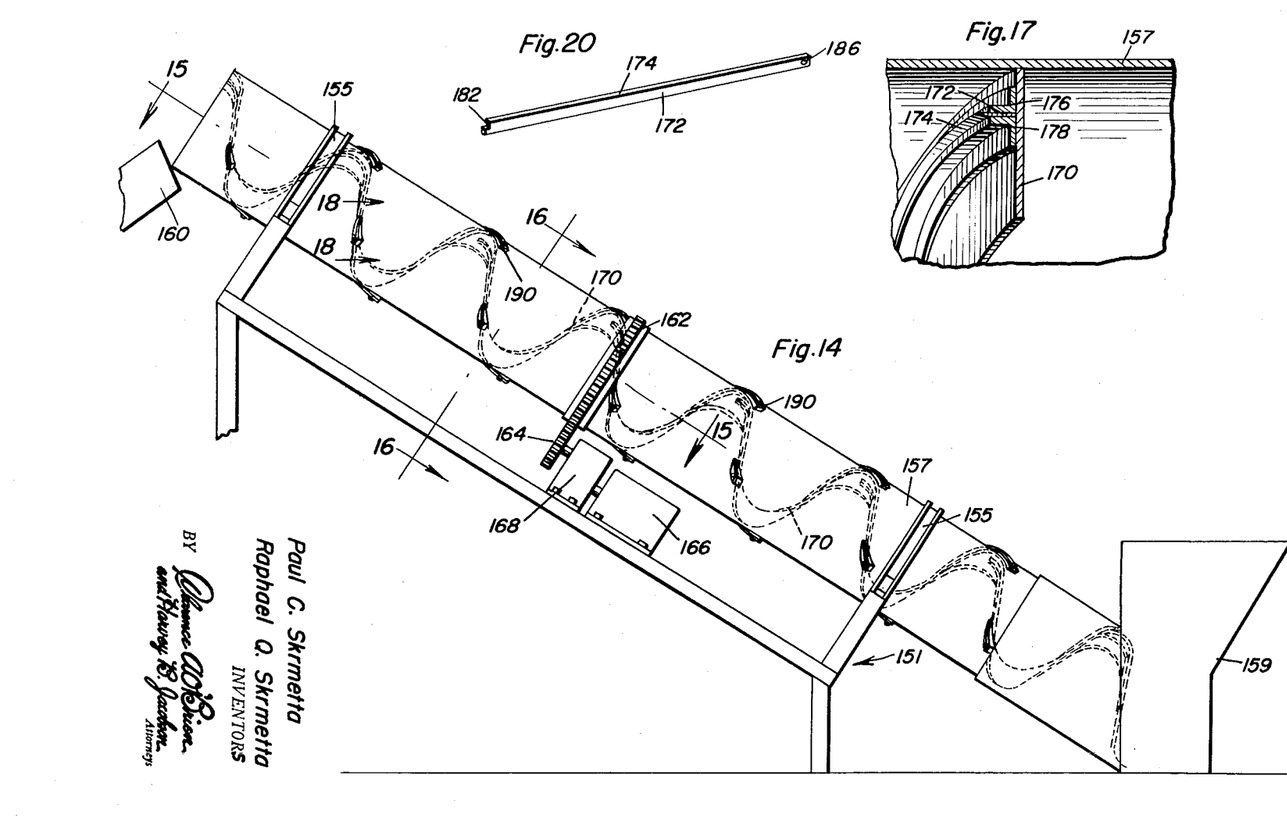
FIGURE 14 is a view in vertical side elevation of a fourth embodiment of apparatus in accordance with the principles of this invention and which includes a rotating barrel having spiral knives therein and which is adapted to convey and elevate the shrimp while de-veining the same during passage of the shrimp through the device.
FIGURE 17 is a further detail view on an enlarged scale showing the structure and association of the knife assembly and the spiral conveying means of the device.
FIGURE 20 is a perspective view of one of the blades employed in the embodiment of FIGURES 14–20.
Figure 15:
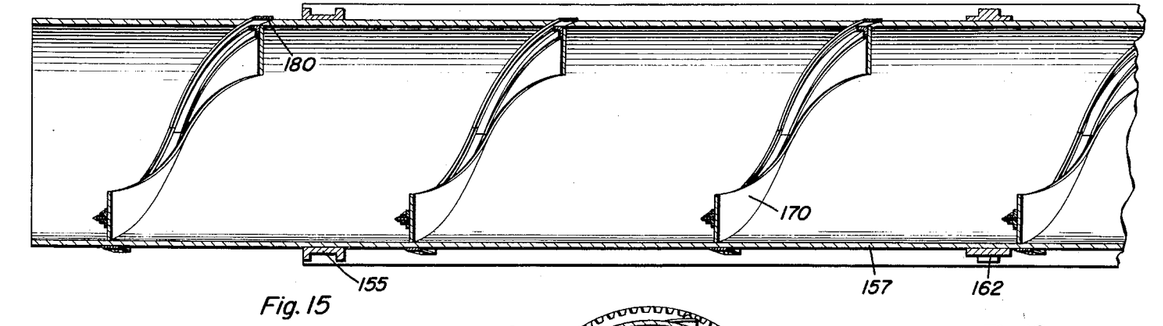
FIGURE 15 is a fragmentary horizontal sectional view taken on an enlarged scale substantially upon the plane indicated by the section line 15—15 of FIGURE 14 and showing certain details of the elevator conveyor means and the knife assembly of the device.
Figures 16, 18, 19:
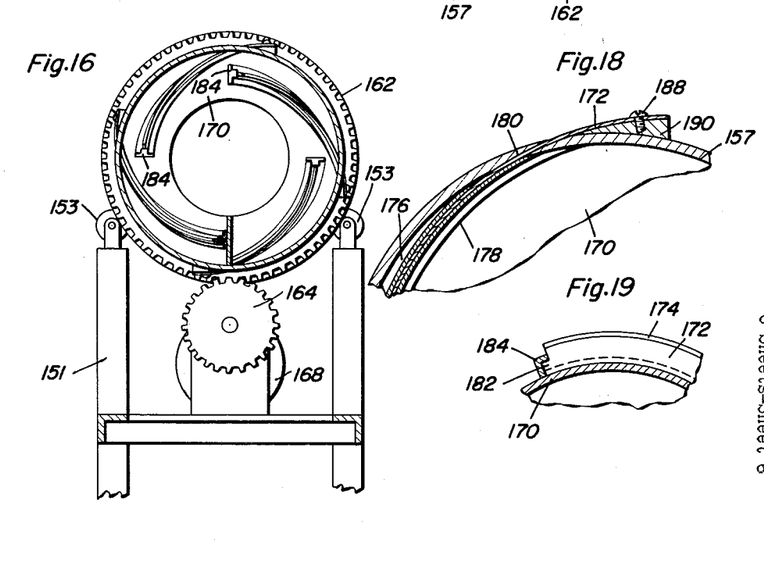
FIGURE 16 is a vertical transverse sectional view taken substantially upon the plane indicated by section line 16—16 of FIGURE 14.
FIGURE 18 is a detail view taken substantially upon the plane indicated by the transverse sectional line 18—18 of FIGURE 14 showing the terminal fastening means for a blade.
FIGURE 19 is a sectional detail view of the means for fastening the other end of a blade.

In the embodiment of FIGURES 14–20, the supporting frame 151 rotatably supports thereon in any desired manner, as for example by means of supporting rollers 153 of FIGURE 16 which ride in the circumferentially extending channel members or tracks 155 of FIGURE 15, to thereby rotatably support an elongated sleeve or barrel 157 which is open at both of its ends and constitutes the passageway through which the shrimp are adapted to pass.

In this embodiment, the open lower end of the barrel communicates with the interior of a hopper 159 into which shrimp may be discharged in any desired manner for treatment by the apparatus. At the open upper end of the barrel there is provided a chute 160 or other means to receive the shrimp which have been elevated and de-veined during such upward travel by the rotating passageway 157.

Continuous rotation rather than reciprocation or oscillation is imparted to the barrel. For this purpose, there is provided an external ring gear 162 secured to the barrel intermediate its ends in any convenient position and which engages with a driving gear 164 and driven by a source of power such as an electric motor 166. A speed reduction gear assembly 168 may be operatively interposed between the motor and the driving gear 164 if desired.

A helical or spiral blade 170, see FIGURES 14, 15, 16 and 17 in particular, is secured to the inside wall of the barrel or passageway 157, being perpendicularly attached thereto as shown in FIGURE 7. This spiral or helical blade serves as an auger screw or spiral conveyor which serves during rotation of the barrel about its longitudinal axis to advance the shrimp up the inclined barrels and eventually discharge the shrimp from the open upper end of the same into the chute 160.

Referring now especially to FIGURE 17 it will be seen that there are provided helical or spirally shaped knife blades 172 having knife edges 174 and which are clamped between a pair of clamping members 176 and 178, the latter being secured to the upper or lifting face of the auger or elevator blade 170. It will be understood that the edges 174 are maintained at a proper spaced distance from the internal wall of the barrel or passageway 157 so that upon rotation of the barrel, as the shrimp are pushed upwardly by the elevating screw 170, they will be appropriately engaged upon their backs by the knife edges 174 to thus slit the back of the shrimp and expose the sand vein in the same manner as the preceding embodiments.

It will be observed that during rotation of the barrel, the sliding and lifting action of the blades on the shrimp will slit the same as well as lift the shrimp, so that the shrimp will be repeatedly lifted and dropped from the upper portion of the cross sectional area of the barrel to the lower portion of the same to be engaged by a successive portion of a blade or blades.

A single blade member 172 may be provided throughout the length of the barrel, but preferably a series of separate endwise disposed blades are provided.

As in the preceding embodiments, a water spray is provided, which in this instance is preferably introduced by any suitable means, not shown, at the open upper end of the barrel and travels by gravity downwardly along the length of the same, the rotation of the barrel serving to distribute this water in a uniform film over the entire internal surface of the same.

Although a single continuous spiral or helical blade and elevator screw 170 is provided, it is preferred as shown in the drawings to provide a series of discontinuous knife elements 172, as will be especially apparent from FIGURE 16. The arrangement is such that as the shrimp travels along a knife edge, with its back being sliced by the same, it will drop off the open end of the blade with which it is engaged and back upon the next following blade. This serves to position the shrimp in different attitudes for engagement by successive blades, thereby insuring an efficient and effective cutting action of the device upon the shrimp during the lifting of the latter.

Although the conveyor blade 170 is a continuous helix extending between the two ends of the barrel 157, the slicing blade assembly preferably comprises a plurality of blades 172 disposed in endwise spaced positions upon the conveyor blade 170.

Each knife blade 172 extends through about 90° of the circumference of the barrel 157 and is slidably insertable endwise through a slot 180 in the barrel and is slidable between the clamp and guide members 176 and 178 on the blade 170. At its inward extremity, each knife blade 172 has a shouldered recess 182, see FIGURES 19, 20, which is seated beneath a retaining bracket 184, see FIGURES 19, 16, on the blade 170. The other knife blade extremity has an aperture 186 which is secured by a fastener 188 to a lug 190, see FIGURE 18, on the exterior of the barrel 157 adjacent the slot 180.

As will be seen from FIGURE 16, the inward end of each knife blade overlies the outward end of an adjacent knife blade. Consequently, as the shrimp move upwardly in the passageway or barrel 157 they will slide along the knife blades 172 and drop from the end thereof to the next adjacent knife blade. These repeated impacts and sliding action upon the blades will effectually slice the back of the shrimp and cut out or loosen the sand vein.

This construction obviously facilitates installation and servicing of the knife blades.

*Method of Operation*

In the various forms of apparatus hereinbefore set forth it will be observed that the same basic principle or method of operation is present in all. Thus, as the shrimp moves or is caused to move along an elongated path of travel, the shrimp are repeatedly shifted or tumbled or thrown or hurled back and forth transversely and across this path of travel to cause the back of the shrimp to strike first one and then another knife element appropriately positioned to slice open the back of the shrimp and expose the sand vein therein. This general mode and method of operation is effected by various structures and by various specific methods. Thus, in the embodiment of FIGURES 1–8, the shrimp are caused to move longitudinally on a flat surface, and to be hurled from side to side against longitudinally extending knives by a rocking of the surface transversely by the longitudinal axis. In the embodiment of FIGURES 9 and 10, the same result is obtained except that the shrimp are hurled from side to side by a rectilinear transverse reciprocation of the passageway along which the shrimp slide. In the further embodiment of FIGURES 11–13, the shrimp are hurled from side to side against longitudinal extending knives by being caused to pass longitudinally along a concave trough which is rocked about a longitudinal axis.

Finally, in the apparatus of FIGURES 14–20, the shrimp are tumbled as they advance upwardly along an incline by a spiral conveyor or screw and are engaged by spiral knives extending spirally of the continuously rotating passageway.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A machine for de-veining shrimp comprising means forming an elongated passageway having a surface along which shrimp are adapted to longitudinally slide, a knife assembly extending longitudinally of said passageway and extending along at least one marginal edge of the latter and defining a continuous side wall to retain shrimp upon said surface, means mounting said knife assembly upon said passageway and at such distance from said surface that said knife assembly will slice the back of a shrimp striking thereagainst for uncovering the sand vein of the shrimp, means operatively associated with said passageway for causing a to and fro motion of the passageway transversely of its longitudinal axis whereby to shift shrimp progressing longitudinally of said surface transversely against said knife assembly.

2. The combination of claim 1 including means operatively associated with said passageway for delivering water to said surface.

3. The combination of claim 1 including means operatively associated with said passageway for delivering water to said surface and substantially uniformly over substantially the entire area of the latter.

4. The combination of claim 1 wherein said surface of said passageway is substantially flat.

5. The combination of claim 1 wherein said surface of said passageway is substantially flat, and means mounting said passageway for rocking movement about an axis of oscillation extending longitudinally of said passageway.

6. The combination of claim 1 wherein said surface of said passageway is substantially flat, and means mounting said passageway for rectilinear reciprocation transversely of the longitudinal axis of said passageway.

7. A shrimp de-veiner comprising means forming a passageway having an elongated shrimp receiving surface over which shrimp are adapted to move longitudinally, a plurality of knife assemblies disposed longitudinally of said surface and extending continuously along the marginal edges of said surface to define side walls for retaining shrimp upon said surface, means mounting said assemblies and said passageway, each knife assembly having a knife blade disposed at a fixed distance from said surface such as to slice the back of a shrimp pressing and moving thereagainst and expose the sand vein thereof, adjacent knife assemblies forming shrimp receiving and de-veining channels therebetween, means operatively associated with said passageway for causing movement of shrimp longitudinally of said passageway and against said knife assemblies and back and forth shifting of shrimp transversely of said channels and against said knife assemblies.

8. The combination of claim 7 including means operatively associated with said passageway for delivering water into said channels beneath said knife assemblies and upon said surface.

9. A shrimp de-veiner comprising a longitudinally extending trough having a bottom surface along which shrimp are adapted to slide, a pair of knife blades disposed in opposed side by side relation and extending longitudinally of said trough, means for supporting said blades in fixed vertically spaced relation above said surface and at a sufficient height above the latter to slice the back of a shrimp and expose the sand vein of the latter when the back of a shrimp is moved along a knife blade, means movably supporting said trough for movement in a direction which is transversely thereof, means connected to said trough for causing a back and forth movement of said trough transversely of its length and of sufficient force to shift shrimp moving longitudinally of said trough transversely thereof and alternately against said opposed knife blades.

10. The combination of claim 9 wherein said knife blades are parallel to the longitudinal axis of said trough.

11. The combination of claim 9 wherein said knife blades extend substantially the length of said trough.

12. The combination of claim 9 including means operatively associated with said trough for delivering water to said bottom surface uniformly over the area of the latter.

13. The combination of claim 12 wherein said last means is mounted under the trough and has apertures through said bottom surface.

14. The combination of claim 9 wherein said supporting means comprises a pivot for said trough extending longitudinally and medially thereof.

15. The combination of claim 9 wherein said supporting means includes a pivoted mounting for said trough journaling the latter for rocking movement about an axis extending longitudinally of said trough.

16. A shrimp de-veiner comprising a member providing an elongated supporting surface upon which shrimp are adapted to slide, a pair of knife blades disposed in opposed side by side relation and with their cutting edges facing each other at opposite sides of said elongated surface, said knife blades extending longitudinally of said elongated surface, means for supporting said blades in fixed, vertically spaced relation above said surface and at a sufficient distance from the latter to slice the back of a shrimp and expose the sand vein of the latter when the back of a shrimp is moved along a knife blade, means movably supporting said member for movement in a direction transverse to said elongated surface, means operatively associated with said member for causing a back and forth movement of said member transversely of said elongated surface and of sufficient force to shift shrimp moving longitudinally of said surface transversely thereof and alternately against said opposed knife blades.

17. The combination of claim 16 wherein said supporting means comprise pivots mounting said member for rocking movement about an axis extending longitudinally of said surface.

References Cited in the file of this patent
UNITED STATES PATENTS

| | | |
|---|---|---|
| 456,448 | Thomas | July 21, 1891 |
| 1,214,234 | Skinner | Jan. 30, 1917 |
| 1,564,914 | Vaughan | Dec. 8, 1925 |
| 1,869,658 | Branda | Aug. 2, 1932 |
| 2,249,787 | Savage | July 22, 1941 |
| 2,486,030 | James | Oct. 25, 1949 |
| 2,694,218 | Lapeyre et al. | Nov. 16, 1954 |
| 2,729,362 | Hughes | Jan. 3, 1956 |